(12) United States Patent
Vavrusa et al.

(10) Patent No.: US 10,375,016 B1
(45) Date of Patent: Aug. 6, 2019

(54) MANAGING DOMAIN NAME SYSTEM (DNS) RECORD CACHE ACROSS MULTIPLE DNS SERVERS USING MULTICAST COMMUNICATION

(71) Applicant: CLOUDFLARE, INC., San Francisco, CA (US)

(72) Inventors: Marek Vavrusa, San Francisco, CA (US); Anbang Wen, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/208,438

(22) Filed: Dec. 3, 2018

Related U.S. Application Data

(60) Provisional application No. 62/651,713, filed on Apr. 2, 2018.

(51) Int. Cl.
*G06F 15/16* (2006.01)
*H04L 29/12* (2006.01)
*H04L 29/08* (2006.01)

(52) U.S. Cl.
CPC ...... *H04L 61/2046* (2013.01); *H04L 61/1511* (2013.01); *H04L 61/1552* (2013.01); *H04L 61/2069* (2013.01); *H04L 67/1036* (2013.01); *H04L 67/2842* (2013.01)

(58) Field of Classification Search
CPC ............. H04L 61/2046; H04L 61/1511; H04L 61/1552; H04L 61/2069; H04L 67/1036; H04L 67/2842

USPC .......................................... 709/245, 223–224
See application file for complete search history.

(56) References Cited

U.S. PATENT DOCUMENTS

| | | | | |
|---|---|---|---|---|
| 2002/0010798 A1* | 1/2002 | Ben-Shaul | ........ | H04L 29/12066 709/247 |
| 2004/0024872 A1* | 2/2004 | Kelley | .............. | H04L 29/12009 709/225 |
| 2004/0078487 A1* | 4/2004 | Cernohous | ........ | H04L 29/12009 709/245 |
| 2007/0014241 A1* | 1/2007 | Banerjee | ........... | H04L 29/12066 370/238 |
| 2010/0269174 A1* | 10/2010 | Shelest | ............. | H04L 29/12066 726/22 |
| 2010/0274970 A1* | 10/2010 | Treuhaft | ........... | H04L 29/12066 711/118 |
| 2011/0270964 A1* | 11/2011 | Huang | .............. | H04L 29/12066 709/224 |

(Continued)

*Primary Examiner* — Philip B Tran
(74) *Attorney, Agent, or Firm* — Nicholson De Vos Webster & Elliott LLP

(57) ABSTRACT

A Domain Name System (DNS) resolver node receives a first DNS query from a first client device. The resolver node determines that it cannot answer the query using its local cache so it performs a recursive query to obtain the answer. The answer is sent to the first client and stored in its local cache. The resolver node further transmits the answer to multiple other resolver nodes that are part of the same cluster so they can update their respective local cache with the information. Upon receiving a message from another resolver node that includes a set of resource record(s) not in its local cache, the resolver node stores that set of resource record(s) in its local cache so that it can locally answer subsequent requests for those resource record(s) locally.

21 Claims, 5 Drawing Sheets

(56) References Cited

U.S. PATENT DOCUMENTS

| | | | | |
|---|---|---|---|---|
| 2012/0117458 A1* | 5/2012 | Holloway | ............ | G06F 16/958 |
| | | | | 715/234 |
| 2012/0254996 A1* | 10/2012 | Wilbourn | ............ | H04L 61/1511 |
| | | | | 726/22 |
| 2013/0173825 A1* | 7/2013 | McPherson | ......... | H04L 61/1511 |
| | | | | 709/245 |
| 2015/0256508 A1* | 9/2015 | Townsend | ............... | H04L 61/20 |
| | | | | 709/245 |
| 2016/0380960 A1* | 12/2016 | Pandrangi | .......... | H04L 61/1511 |
| | | | | 709/224 |

\* cited by examiner

MANAGING DOMAIN NAME SYSTEM (DNS) RECORD CACHE ACROSS MULTIPLE DNS SERVERS USING MULTICAST COMMUNICATION

CROSS-REFERENCE TO RELATED APPLICATIONS

This application claims the benefit of U.S. Provisional Application No. 62/651,713, filed Apr. 2, 2018, which is hereby incorporated by reference.

FIELD

Embodiments of the invention relate to the field of network communication; and more specifically, to managing Domain Name System (DNS) record cache across multiple DNS servers using Multicast communication.

BACKGROUND

The Domain Name System (DNS) is used for translating domain names into IP addresses and is an essential part of the Internet. DNS is composed of nameservers that are typically accessed in a recursive manner to obtain the IP address for a requested domain name. For example, a DNS query for an address record is received for "www.example.com" by a nameserver (sometimes referred to as a resolver). This resolver is commonly provided by the client's Internet Service Provider (ISP) or through a public resolver. If the DNS record that answers the query is not in the nameserver's local cache, the nameserver queries the authoritative DNS hierarchy to find the answer. Upon receiving a query that is not in its cache, the resolver may generate and send a DNS query to root DNS nameservers, which can include several nameservers. A root nameserver responds to the DNS query with an answer including an IP address of one or more authoritative name servers serving the ".com" domain. The nameserver then sends a DNS query to the one or more authoritative name servers for the ".com" domain, which then responds with an IP address of one or more authoritative name servers of the domain "example.com". In some cases, this process is repeatedly performed between the nameserver and the one or more authoritative nameservers until a response is received, where the response can be either an IP address for the requested domain or a server failure message. When the IP address for "www.example.com" is located, the authoritative nameserver for "example.com" sends the IP address to the nameserver. The IP address is then returned to the requesting device, and the requesting device can issue an HTTP request using the IP address for "www.example.com".

There are many factors that affect how fast a resolver is. A main factor is whether the resolver can answer from its cache. If it can, then the time to answer is the round-trip time for a packet from the requester to the resolver. If it cannot, then the time to answer is affected by the recursive lookup.

A resolver service may include many different resolvers in one or more data centers. The resolver IP addresses are typically anycast addresses. As a result, the particular resolver that handles answering the DNS query is the one that is nearest to the requester. Within a data center, there may be multiple nodes (e.g., hundreds of nodes) operating as a cluster. Each particular node may have its own local cache. To manage these caches, a common solution is to put a caching load balancer in front of each of these nodes. However, this introduces a single point-of-failure.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for managing Domain Name System (DNS) record cache across multiple DNS servers using Multicast communication is described. Multiple DNS resolvers (which may be part of the same data center) each join the same multicast group. Upon a resolver receiving a DNS query that cannot be answered using the local cache, the resolver obtains the answer from the authoritative nameserver(s) and writes the answer in its local cache. The resolver also transmits a message containing the resource record(s) of the answer to the multicast interface in which the other DNS resolvers are listening (sometimes referred herein as a cache-update message). The other DNS resolvers update their local cache according to the cache-update message.

Figure 1:
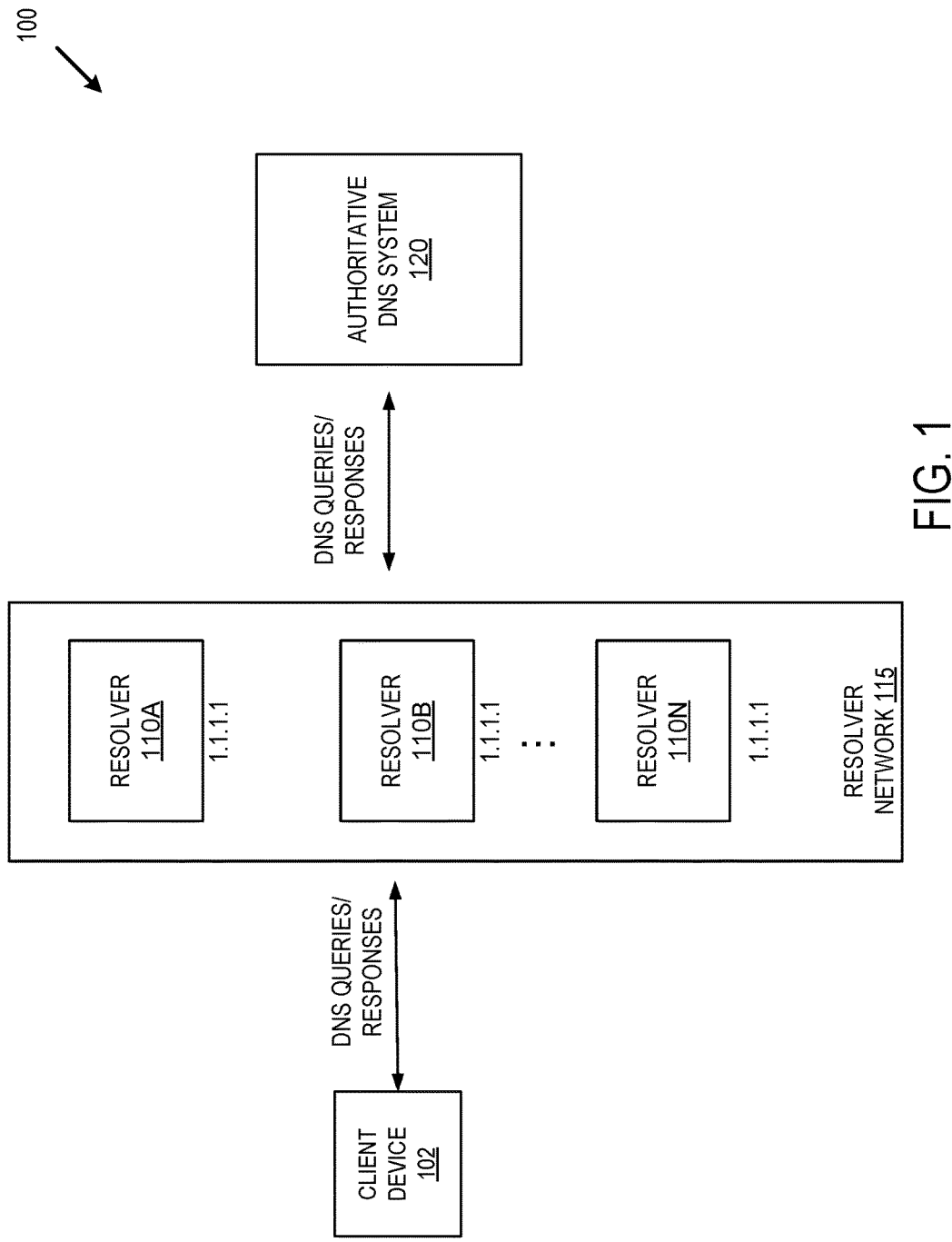
FIG. 1 illustrates an exemplary DNS system for resolving DNS queries using techniques described herein, according to an embodiment.

FIG. 1 illustrates an exemplary DNS system for resolving DNS queries using techniques described herein. The system 100 of FIG. 1 includes a client device 102, a resolver network 115 that includes resolvers 115A-N, and the authoritative DNS system 120. The client device 102 is a computing device that transmits DNS queries and receives DNS responses (among other things). The client device 102 may be, for example, a desktop, laptop, smartphone, etc. that is operated by an end user, or any other computing device (e.g., a server) that issues a DNS query that may or may not be operated by an end user. For example, the client device 102 may include a client program to access the Internet such as a web browser or email application that causes DNS queries to be sent. For example, a user using the client device 102 may input a domain name into the address bar of their browser (e.g., http://www.example.com) to access that page, which causes the browser to make a request for the IP address mapped to that domain name.

The resolver network 115 is a distributed network that includes the resolvers 115A-N. The resolvers 115A-N may be geographically distributed. The resolvers 115A-N may be anycasted to the same address (e.g., 1.1.1.1). As a result, when a requesting device (e.g., client device 102) transmits a DNS query for a domain, the DNS query is received by the closest one of the resolvers 110A-N as determined by the anycast protocol. After receiving a DNS query that it cannot answer, the resolver recursively determines the answer (if one is available) by querying the authoritative DNS system 120 one or more times. The resolver makes a series of requests until it reaches the origin authoritative nameserver for the requested record (or times out or returns an error if no record or domain is found). The authoritative DNS system 120 provides the authoritative answers to the DNS queries. The authoritative DNS system 120 includes, for example, root nameserver(s), top level domain nameserver (s), and origin authoritative nameserver(s).

Figure 2:
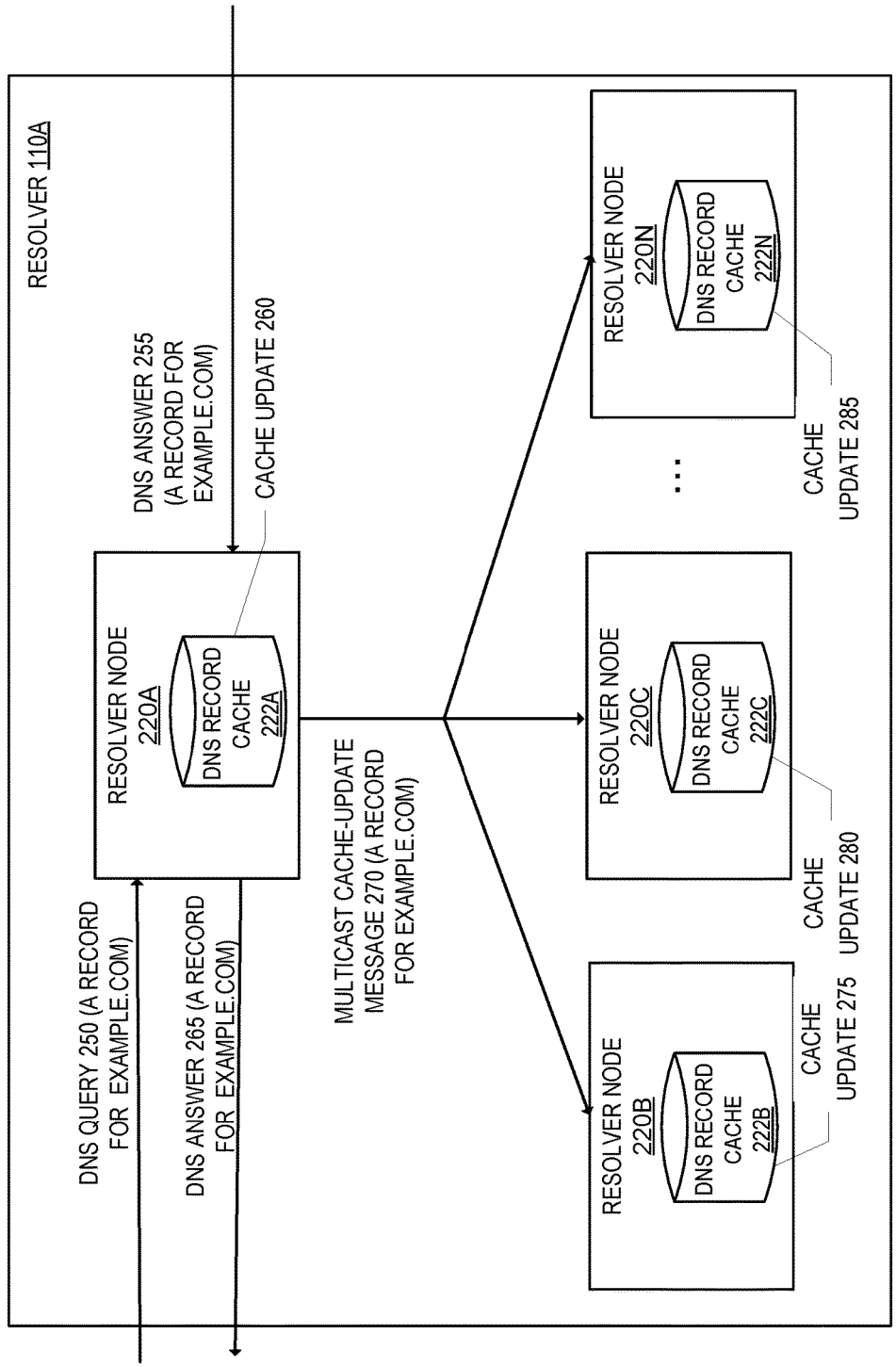
FIG. 2 illustrates an example of a resolver of FIG. 1 in more detail that includes multiple resolver nodes that operate together as a cluster, according to an embodiment.

Each of the resolvers 110A-N includes one or more resolver nodes that may operate together as a cluster. FIG. 2 illustrates an example of the resolver 110A that includes the resolver nodes 220A-N that operate together as a cluster. Each of the resolver nodes 220A-N may be a separate physical device, a separate virtual machine on the same physical device, or a combination of physical devices and virtual machines. The resolver nodes 220A-N may be part of the same data center. There may be hundreds of resolver nodes that operate together as a cluster.

The resolver nodes 220A-N include separate DNS record caches 222A-N respectively. Thus, instead of relying on a centralized cache, the resolver nodes 220A-N each have their own cache. The resolver nodes 220A-N use multicast communication to communicate cache-updates amongst themselves. Each of the resolver nodes 220A-N is part of the same multicast group. That is, each of the resolver nodes 220A-N joins the same multicast group. The multicast group may be within a single L2 domain. If a resolver node transmits a cache-update message over the multicast interface, the other resolver nodes that are listening on that interface receive the message and can update their caches accordingly.

FIG. 2 also illustrates an example of operations that is performed when updating the DNS record caches of the resolver nodes 220A-N. The resolver node 220A receives a DNS query. In this example, the resolver node 220A receives a query 250 for an Address record (e.g., an A or AAAA record) for the domain "example.com." Although the example described is for an Address record, any other resource record type may be processed by the resolver node 220A. The resolver node 220A determines whether it can answer the DNS query using information in its local DNS record cache 222A (e.g., whether the requested resource record is in cache and its TTL has not expired). If it can, then the resolver node 220A transmits a response to the client that includes the resource record from its local DNS record cache 222A. If the resolver node 220A cannot answer the DNS query with information in its local DNS record cache 222A, the resolver node 220A recursively determines the answer (if one is available) by querying the authoritative DNS system 120 one or more times.

In the example of FIG. 2, the Address record for the domain "example.com" is not in the DNS record cache 222A, so the resolver node 220A transmits one or more queries for the record to the DNS system 120. Although the Address record for the domain "example.com" is not at this moment included in the DNS record cache 222A, that record could within one or more of the DNS record caches 222B-N of the resolver nodes 220B-N. The resolver node 220A receives an answer 255 that includes the Address record for "example.com." The resolver node 220A updates 260 its local DNS record cache 222A with the Address record for "example.com"; and transmits a DNS answer 265 that includes the requested record to the client.

The resolver node 220A also transmits a multicast cache-update message 270 that includes the resource record(s) of the answer to the other members of the multicast group (the resolver nodes 220B-N). The cache-update message includes all the records written into the DNS record cache, including the requested resource record and any records such as delegation chain, keys, and/or signatures. If the cache-update message is sent over multiple packets due to maximum transmission unit (MTU) size constraints, the cache-update message is split in a way so that its resource record and corresponding signature record are sent in the same packet.

The resolver nodes 220B-N listen on the same multicast interface and receive the multicast cache-update message 270. The resolver nodes 220B-N update their local DNS record cache if appropriate. As described earlier, any of the resolver nodes 220B-N may already have cached the information that would have been able to answer the DNS query 250. For each resource record that is included in the multicast cache-update message 270, each of the resolver nodes 220B-N determines whether to update their local DNS record cache. For example, the resolver node 220B determines whether to perform a cache update 275 to write the record into the DNS record cache 222B, the resolver node 220C determines whether to perform a cache update 280 to write the record into the DNS record cache 222C, and the resolver node 220N determines whether to perform a cache update 285 to write the record into the DNS record cache 222N. If the receiving resolver node already has the resource record cached with a rank equal or greater than the resource record included in the cache-update message, then it will not update the cache. If the receiving resolver node does not have the resource record cached with a rank equal or greater than the resource record included in the cache-update message, then the cache will be updated to include that resource record. The ranking may be performed according to RFC 2181 "Clarifications to the DNS Specification," July 1997.

Figure 3:
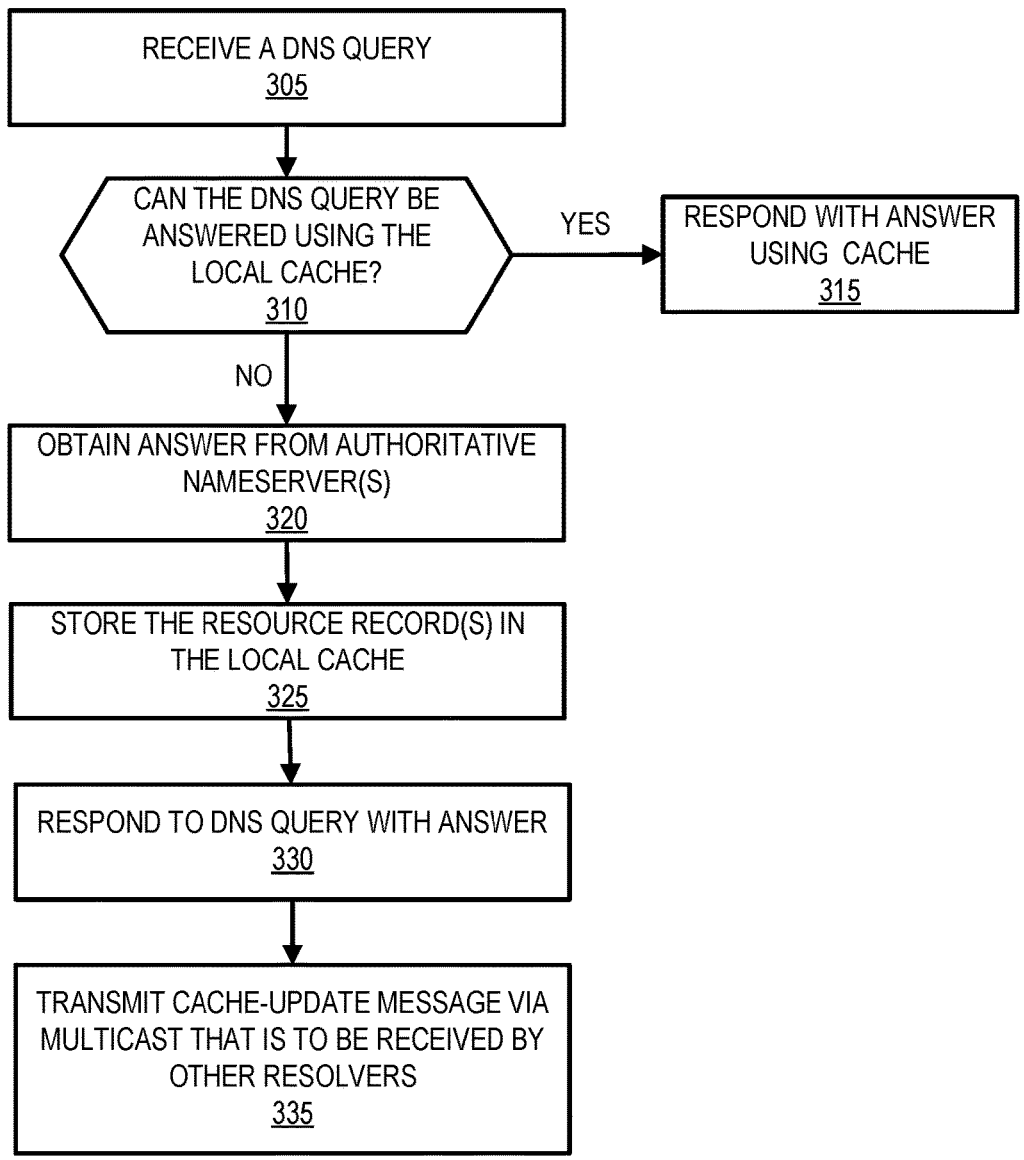
FIG. 3 is a flow diagram that illustrates exemplary operations performed by a resolver node for managing DNS record cache, according to an embodiment.

FIG. 3 is a flow diagram that illustrates exemplary operations performed by a resolver node for managing DNS record cache, according to an embodiment. The operations of FIG. 3 will be described with respect to FIGS. 1 and 2 and are being performed by the resolver node 220A.

At operation 305, the resolver node 220A receives a DNS query from the client device 102. The DNS query may be for any record type (e.g., Address record (A or AAAA), canonical name (CNAME) record, mail exchange (MX) record, name server (NS) record, pointer (PTR) record, start of authority (SOA) record, etc.).

Next, at operation 310, the resolver node 220A determines whether the DNS query can be answered using its local DNS record cache 222A. For instance, the resolver node 220A determines whether the DNS record cache 222A includes the requested record type and its TTL value has not expired. If the resolver node 220A can answer the DNS query using its local DNS record cache 222A, then the resolver node 220A transmits a response to the client device 102 using the cached information at operation 315.

If the resolver node 220A cannot answer the DNS query using the local DNS record cache 222A (e.g., the record does not exist or the TTL value has expired), then the resolver node 220A obtains the answer from the authoritative nameservers of the authoritative DNS system 120 at operation 320. This may require one or more requests until it reaches the origin authoritative nameserver for the requested record, or until it times out or an error is returned.

After obtaining the answer, the resolver node 220A stores the resource record(s) returned in the answer in its local DNS record cache 222A at operation 325. The resolver node 220A transmits a response to the client device 102 that answers the query at operation 330.

The resolver node 220A also transmits a cache-update message via multicast to the other members of the multicast group (the resolver nodes 220B-N) at operation 335. The cache-update message includes all the records written into the DNS record cache 222A, including the requested resource record and any records such as delegation chain, keys, and/or signatures. If the cache-update message is sent over multiple packets due to maximum transmission unit (MTU) size constraints, the cache-update message is split in a way so that its resource record and corresponding signature record are sent in the same packet.

Figure 4:
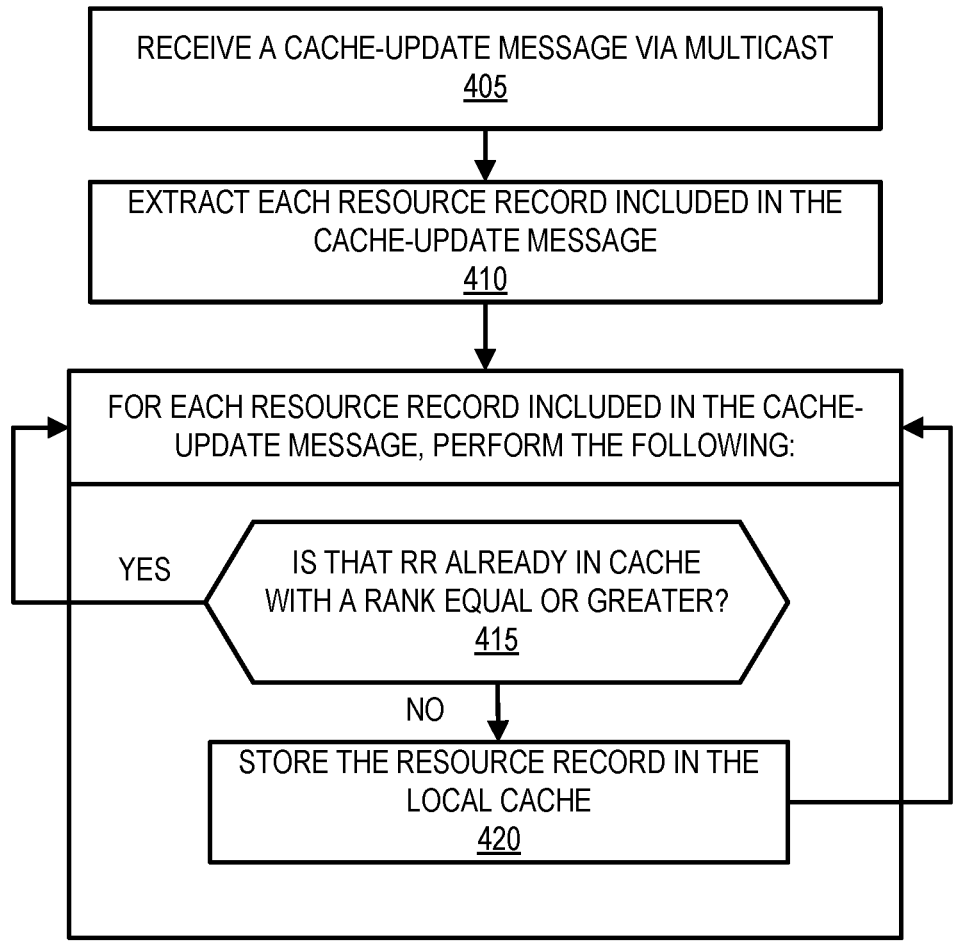
FIG. 4 is a flow diagram that illustrates exemplary operations performed by a resolver node that receives a cache-update message, according to an embodiment.

FIG. 4 is a flow diagram that illustrates exemplary operations performed by a resolver node that receives a cache-update message, according to an embodiment. The operations of FIG. 4 will be described with respect to FIG. 2 and are being performed by the resolver node 220B.

At operation 405, the resolver node 220B receives a cache-update message via the multicast interface. The cache-update message was sent by one of the other resolver nodes of the resolver 110A. The cache-update message includes one or more resource records. Next, at operation 410, the resolver node 220B extracts each resource record included in the cache-update message. For each of the resource records, the resolver node 220B determines at operation 415 whether that resource record is already in its local DNS record cache 222B with a rank equal or greater than the resource record in the cache-update message. If the resource record is already in the local DNS record cache 222B with a rank greater than or equal to the resource record in the cache-update message, then the DNS record cache 222B will not be updated and the next resource record (if any) included in the cache-update message is checked. If the resource record is not already in the local DNS record cache 222B with a rank greater than or equal to the resource record in the cache-update message, then the resolver node 220B stores that resource record in the local DNS record cache 222B at operation 420, and then checks the next resource record (if any).

The use of multicast to distribute DNS record cache updates reduces the number of outbound queries toward the authoritative nameservers. For example, only a single node of the multicast group must perform the full query and then that single node can update its peers. The separate caches effectively become loosely mirrored or synchronized through this process. This improves the cache hit ratio and improves the speed at which the queries are answered. For instance, when subsequent requests for that record arrive at any of the resolver nodes 220A-N, the resolver nodes 220A-N can respond locally from its cache instead of looking up the answer from the authoritative nameservers. This reduces the time to answer to the round-trip time for a packet from the requester to the resolver, as opposed to the time to answer being affected by the recursive lookup. Further, unlike other techniques that put a caching load balancer in front of nodes that introduces a single point-of-failure, the cache architecture described herein is distributed thereby eliminating the single point-of-failure.

Although embodiments have been described with multiple resolver nodes within the same data center belonging to the same multicast group to distribute DNS record updated, similar techniques can be used for multiple resolver nodes across multiple data centers. In such a case, the multicast communication is secured over a secure tunnel (e.g., a generic routing encapsulation (GRE) tunnel), and/or protected with transaction signature (TSIG).

Figure 5:
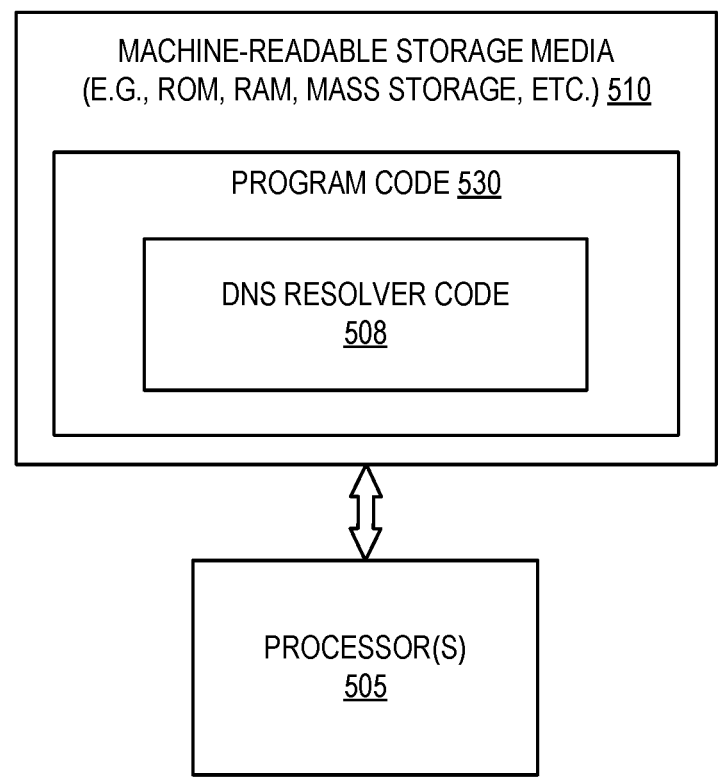
FIG. 5 illustrates an exemplary format of a data processing system that may be used according to some embodiments.

FIG. 5 illustrates a block diagram for an exemplary data processing system 500 that may be used in some embodiments. Data processing system 500 includes one or more processors 505 and connected system components (e.g., multiple connected chips). Alternatively, the data processing system 500 is a system on a chip or Field-Programmable gate array. One or more such data processing systems 500 may be utilized to implement the embodiments and operations described with reference to FIGS. 1-4.

The data processing system 500 is an electronic device which stores and transmits (internally and/or with other electronic devices over a network) code (which is composed of software instructions and which is sometimes referred to as computer program code or a computer program) and/or data using machine-readable media (also called computer-readable media), such as non-transitory machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 505. For example, the depicted machine-readable storage media 510 may store program code 530 that, when executed by the processor(s) 505, causes the data processing system 500 to perform the DNS resolver functionality described herein. For example, the program code 530 may include the DNS resolver code 508 that, when executed by the processor(s) 505, cause the data processing system 500 to perform the operations of FIGS. 3-4.

The data processing system 500 also includes a set or one or more physical network interface(s) to establish network connections (to transmit and/or receive code and/or data using propagating signals) with other electronic devices. It will be appreciated that one or more buses may be used to interconnect the various components shown in FIG. 5. One or more parts of an embodiment of the invention may be implemented using different combinations of software, firmware, and/or hardware. In an embodiment, the resolver devices may take the form of the data processing system 500.

In the preceding description, numerous specific details are set forth. However, embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a Domain Name System (DNS) resolver node, comprising:
   receiving a first DNS query from a first client device;
   determining that an answer to the first DNS query cannot be currently generated using a cache local to the resolver node, wherein the resolver node is one of a plurality of resolver nodes that each are part of a same multicast group;
   performing a recursive query with a set of one or more other authoritative nameservers to obtain a first answer to the first DNS query, wherein the first answer includes a first set of one or more DNS resource records;
   storing the first set of DNS resource records in the cache local to the resolver node;
   transmitting the first answer to the first client device;
   transmitting a first message to a multicast interface in which each of the plurality of resolver nodes are listening, the first message including the first set of DNS resource records;
   receiving a second message on the multicast interface from one of the other of plurality of resolver nodes, the second message including a second set of DNS resource records;
   determining that the second set of DNS resource records included in the second message is not included in the cache local to the resolver node;
   storing the second set of DNS resource records in the cache local to the resolver node;
   receiving a second DNS query from a second client device;
   determining that the stored second set of DNS resource records in the cache local to the resolver node answers the second DNS query;
   generating a second answer to the second DNS query using the stored second set of DNS resource records in the cache local to the resolver node; and
   transmitting the generated second answer to the second DNS query to the second client device.

2. The method of claim 1, wherein each of the plurality of resolver nodes are anycasted to a same IP address.

3. The method of claim 1, further comprising:
   wherein the first set of DNS resource records includes a signature record that corresponds with another resource record; and
   responsive to determining that the first message exceeds a maximum transmission unit (MTU) size, ensuring that the signature record and corresponding resource record are sent in a same packet.

4. The method of claim 1, wherein determining that the answer to the first DNS query cannot be currently generated using the cache local to the resolver node includes determining that a requested resource record is not in the cache or that a TTL value of the requested resource record has expired.

5. The method of claim 1, wherein the plurality of resolver nodes is part of a same data center.

6. The method of claim 1, wherein the plurality of resolver nodes is part of different data centers.

7. The method of claim 6, wherein the first message and the second message are over a secure tunnel and protected with transaction signature (TSIG).

8. A non-transitory machine-readable storage medium that stores instructions, that when executed by a processor of a Domain Name System (DNS) resolver node causes said processor to perform the operations comprising:
   receiving a first DNS query from a first client device;
   determining that an answer to the first DNS query cannot be currently generated using a cache local to the resolver node, wherein the resolver node is one of a plurality of resolver nodes that each are part of a same multicast group;
   performing a recursive query with a set of one or more other authoritative nameservers to obtain a first answer to the first DNS query, wherein the first answer includes a first set of one or more DNS resource records;
   storing the first set of DNS resource records in the cache local to the resolver node;
   transmitting the first answer to the first client device;
   transmitting a first message to a multicast interface in which each of the plurality of resolver nodes are listening, the first message including the first set of DNS resource records;
   receiving a second message on the multicast interface from one of the other of plurality of resolver nodes, the second message including a second set of DNS resource records;
   determining that the second set of DNS resource records included in the second message is not included in the cache local to the resolver node;
   storing the second set of DNS resource records in the cache local to the resolver node;
   receiving a second DNS query from a second client device;
   determining that the stored second set of DNS resource records in the cache local to the resolver node answers the second DNS query;
   generating a second answer to the second DNS query using the stored second set of DNS resource records in the cache local to the resolver node; and
   transmitting the generated second answer to the second DNS query to the second client device.

9. The non-transitory machine-readable storage medium of claim 8, wherein each of the plurality of resolver nodes are anycasted to a same IP address.

10. The non-transitory machine-readable storage medium of claim 8 that further stores instructions that, when executed by the processor of the resolver node causes said processor to further perform the operations comprising:
    wherein the first set of DNS resource records includes a signature record that corresponds with another resource record; and
    responsive to determining that the first message exceeds a maximum transmission unit (MTU) size, ensuring that the signature record and corresponding resource record are sent in a same packet.

11. The non-transitory machine-readable storage medium of claim 8, wherein determining that the answer to the first DNS query cannot be currently generated using the cache local to the resolver node includes determining that a requested resource record is not in the cache or that a TTL value of the requested resource record has expired.

12. The non-transitory machine-readable storage medium of claim 8, wherein the plurality of resolver nodes is part of a same data center.

13. The non-transitory machine-readable storage medium of claim 8, wherein the plurality of resolver nodes is part of different data centers.

14. The non-transitory machine-readable storage medium of claim 13, wherein the first message and the second message are over a secure tunnel and protected with transaction signature (TSIG).

15. A Domain Name System (DNS) resolver node, comprising:
  a processor; and
  a non-transitory machine-readable storage medium that provides instructions that, when executed by the processor, causes the resolver node to perform operations comprising:
    receive a first DNS query from a first client device;
    determine that an answer to the first DNS query cannot be currently generated using a cache local to the resolver node, wherein the resolver node is one of a plurality of resolver nodes that each are part of a same multicast group;
    perform a recursive query with a set of one or more other authoritative nameservers to obtain a first answer to the first DNS query, wherein the first answer is to include a first set of one or more DNS resource records;
    store the first set of DNS resource records in the cache local to the resolver node;
    transmit the first answer to the first client device;
    transmit a first message to a multicast interface in which each of the plurality of resolver nodes are listening, the first message to include the first set of DNS resource records;
    receive a second message on the multicast interface from one of the other of plurality of resolver nodes, the second message to include a second set of DNS resource records;
    determine that the second set of DNS resource records included in the second message is not included in the cache local to the resolver node;
    store the second set of DNS resource records in the cache local to the resolver node;
    receive a second DNS query from a second client device;
    determine that the stored second set of DNS resource records in the cache local to the resolver node answers the second DNS query;
    generate a second answer to the second DNS query using the stored second set of DNS resource records in the cache local to the resolver node; and
    transmit the generated second answer to the second DNS query to the second client device.

16. The resolver node of claim 15, wherein each of the plurality of resolver nodes are to be anycasted to a same IP address.

17. The resolver node of claim 15, wherein the non-transitory machine-readable storage medium further stores instructions that, when executed by the processor of the resolver node causes said processor to further perform the operations comprising:
  wherein the first set of DNS resource records is to include a signature record that corresponds with another resource record; and
  responsive to a determination that the first message exceeds a maximum transmission unit (MTU) size, ensure that the signature record and corresponding resource record are sent in a same packet.

18. The resolver node of claim 15, wherein a determination that the answer to the first DNS query cannot be currently generated using the cache local to the resolver node includes a determination that a requested resource record is not in the cache or that a TTL value of the requested resource record has expired.

19. The resolver node of claim 15, wherein the plurality of resolver nodes is part of a same data center.

20. The resolver node of claim 15 wherein the plurality of resolver nodes is part of different data centers.

21. The resolver node of claim 20, wherein the first message and the second message are over a secure tunnel and protected with transaction signature (TSIG).

* * * * *